United States Patent
Takagi et al.

(10) Patent No.: US 7,681,218 B2
(45) Date of Patent: Mar. 16, 2010

(54) DIGITAL TELEVISION BROADCAST SIGNAL RECEIVER

(75) Inventors: Toshihiro Takagi, Daito (JP); Masanori Kawai, Daito (JP); Naoki Yamamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1203 days.

(21) Appl. No.: 11/116,381

(22) Filed: Apr. 28, 2005

(65) Prior Publication Data

US 2005/0246743 A1 Nov. 3, 2005

(30) Foreign Application Priority Data

Apr. 28, 2004 (JP) ............... 2004-132343

(51) Int. Cl.
 H04N 7/16 (2006.01)
 H04N 5/50 (2006.01)
 H04B 1/16 (2006.01)

(52) U.S. Cl. .............. 725/72; 348/731; 348/732; 455/342

(58) Field of Classification Search ........... 725/72; 348/731, 732; 455/342
See application file for complete search history.

(56) References Cited

U.S. PATENT DOCUMENTS

| 5,448,248 | A * | 9/1995 | Anttila | 342/400 |
| 6,496,140 | B1 * | 12/2002 | Alastalo | 342/174 |
| 6,867,819 | B2 * | 3/2005 | Lee | 348/725 |
| 2003/0100343 | A1 * | 5/2003 | Zourntos et al. | 455/562 |
| 2003/0160719 | A1 * | 8/2003 | Hancock | 342/368 |
| 2003/0228857 | A1 * | 12/2003 | Maeki | 455/278.1 |
| 2004/0114535 | A1 * | 6/2004 | Hoffmann et al. | 370/252 |
| 2004/0196834 | A1 * | 10/2004 | Ofek et al. | 370/352 |
| 2004/0248517 | A1 * | 12/2004 | Reichgott et al. | 455/63.4 |
| 2005/0181733 | A1 * | 8/2005 | Zangi et al. | 455/67.11 |

FOREIGN PATENT DOCUMENTS

| JP | 05-232205 | 9/1993 |
| JP | 2001-332991 | 11/2001 |
| JP | 2003-60423 | 2/2003 |

OTHER PUBLICATIONS

Office Action in Japanese Patent Application No. 2004-132343 dated Dec. 16, 2008.

* cited by examiner

*Primary Examiner*—Scott Beliveau
*Assistant Examiner*—Mark P Stanley
(74) *Attorney, Agent, or Firm*—Crowell & Moring LLP

(57) ABSTRACT

When a multi-directional antenna is connected to a digital TV broadcast signal receiver, the digital TV broadcast signal receiver measures a term suitable for switching or changing an effective signal receiving direction of the multi-directional antenna corresponding to kind or specification of the multi-directional antenna. Control signals are outputted at an interval suitable for switching or changing the effective signal receiving direction of the multi-directional antenna corresponding to the measured term so as to switch the effective signal receiving direction of the multi-directional antenna to an optimum signal receiving direction of a channel chosen by a user. Consequently, it is possible to shorten a term necessary for switching or changing the effective signal receiving direction of the multi-directional antenna to the optimum signal receiving direction of the channel chosen by the user.

7 Claims, 7 Drawing Sheets

ROTATING ANTENNA WITH MOTOR

TV BROADCAST SIGNAL

SWITCHING ELECTRONIC SWITCHES

TV BROADCAST SIGNAL

DIGITAL TELEVISION BROADCAST SIGNAL RECEIVER

BACKGROUND OF THE INVENTION

1. Field of the Invention

The present invention relates to a digital television (TV) broadcast signal receiver that can receive digital television broadcast signals such as ATSC (Advanced television systems Committee).

2. Description of the Related Art

In the North American Continent where an ATSC digital television broadcast (it is abbreviated to a hereinafter TV broadcast) is performed, plains are dotted with metropolises, so that various TV broadcast signals broadcasted in the suburbs of each metropolis can be received at other cities or the halfway point of the cities. In consideration from a user who receives the TV broadcast signals, since many TV broadcast signals are transmitted in various directions, it is necessary to regulate a direction of an antenna in an orientation to a TV broadcasting station from which a program which he wants to watch is delivered. Therefore, a multi-directional antenna such as a smart antenna is put into practical use.

With respect to an apparatus for controlling a signal receiving direction of an antenna, Publication of Japanese Patent Application No. 5-232205 shows an apparatus mounted on a moving body such as a vehicle for following a communication satellite. Publication of Japanese Patent Application No. 2003-60423 shows a smart antenna used for communicating between a mobile phone and a base station.

According to the EIA-909 technical standard, it is provided that a smart antenna has sixteen signal receiving directions in respective directions where a circle is divided into sixteen.

By the way, there are many types of the multi-directional antenna, for example, a type for rotating an antenna with a motor for switching the signal receiving direction, or a type with a plurality of antennas and electronic switches in which a signal receiving direction is switched by switching on and off of the electronic switches (the antenna itself is immovable). A term necessary for switching the signal receiving direction of the multi-directional antenna is uneven according to a configuration, specification, and so on of the multi-directional antenna. Specifically, the term necessary for rotating the effective signal receiving direction of the antenna with the motor is much longer than that for switching the effective signal receiving direction of the multi-directional antenna by switching the electronic switches. Furthermore, even in the same type of rotating an antenna with a motor, the power of the motor is different according to the specification or price of the multi-directional antenna. Thus, the rotation speed of the antenna or the term necessary for changing the effective signal receiving direction of the motor is uneven.

On the other hand, a digital TV broadcast signal receiver in compliance with the EIA-909 technical standard can switch an effective signal receiving direction of the multi-directional antenna such as the smart antenna to one of all the sixteen signal receiving directions. The digital TV broadcast signal receiver, however, has no function for distinguishing the kinds or specification of the connected multi-directional antennas. Therefore, a control signal for switching or changing the effective signal receiving direction of the multi-directional antenna is outputted from the digital TV broadcast signal receiver to the multi-directional antenna at an interval (first interval) longer than a term necessary for changing the effective signal receiving direction of the multi-directional antenna in which the rotation speed of the antenna is slowest among the ones available in the market.

In addition, there are digital TV broadcast signal receivers having an automatic scanning function for selecting a signal receiving direction of the multi-directional antenna in which a TV broadcast signal of a channel chosen by a user can be received at the best condition. In general, an antenna of a TV station, that is, a position of a TV tower is invariance. Thus, a TV broadcast signal of each channel is searched in each sixteen signal receiving direction as an initial processing of the digital TV broadcast signal receiver, and a signal receiving direction, in which the signal receiving condition is the most suitable, is set as an optimum signal receiving direction of each channel. For example, in the United States, a TV station can be established relatively easier. In contrast, a TV station suddenly becomes bankrupt. Therefore, it happens that a new channel, which cannot be received beforetime, can be received, or an old channel receivable long before cannot be received. Furthermore, a signal receiving condition of a TV broadcast signal of a channel is varied due to construction of a high-rise building. Thus, it becomes necessary to reset an optimum signal receiving direction for receiving a TV broadcast signal of a channel chosen by a user. Even when a multi-directional antenna having a shorter term necessary for switching or changing the effective signal receiving direction of the multi-directional antenna is connected to a digital TV broadcast signal receiver with automatic scanning function, the interval of outputting the control signals for switching or changing the effective signal receiving direction of the multi-directional antenna is longer. Thus, a term for switching or changing the effective signal receiving direction of the multi-directional antenna to an optimum signal receiving direction of a channel chosen by a user becomes much longer, and it causes the irritation of the user. Especially when the user reshuffles the channel frequently, the automatic scanning operation cannot catch up with the channel reshuffling operation, so that the automatic scanning is nonfunctional in practice.

SUMMARY OF THE INVENTION

A purpose of the present invention is to provide a digital TV broadcast signal receiver obtaining a term suitable for switching or changing effective signal receiving direction of a multi-directional antenna when it is connected to the digital TV broadcast signal receiver, so that a term necessary for deciding an optimum signal receiving direction of each channel can be shortened A digital TV broadcast signal receiver in accordance with an aspect of the present invention connected to a multi-directional antenna having a plurality of signal receiving directions in compliance with a predetermined technical standard, receiving a digital television broadcast signal by making only one signal receiving direction among a plurality of the signal receiving directions effective, comprises a tuner for receiving a digital television broadcast signal through the multi-directional antenna, and a controller for switching an effective signal receiving direction of the multi-directional antenna.

When a multi-directional antenna is connected to the tuner, the controller measures a term suitable for switching or changing an effective signal receiving direction of the multi-directional antenna connected thereto is measured.

When a user choose a channel, the controller outputs control signals at an interval corresponding to the measured term so as to switch the effective signal receiving direction of the multi-directional antenna to an optimum signal receiving direction of the channel.

By such a configuration, it is possible to shorten a term necessary for switching or changing the effective signal receiving direction of the multi-directional antenna to the optimum signal receiving direction of the channel chosen by the user. Especially, it is more effective in an automatic scanning mode for automatically setting the effective signal receiving direction of the multi-directional antenna to a signal receiving direction showing the largest value of the sensitivity of the TV broadcast signal of the channel chosen by the user. In addition, the number of the signal receiving directions of the multi-directional antenna is not limited to sixteen as described in the embodiment. It is possible that the multi-directional antenna can have four, eight or other number of signal receiving directions.

It is possible that the controller performs following operations for measuring the term suitable for switching or changing the effective signal receiving direction of the multi-directional antenna:

selecting two signal receiving directions among a plurality of signal receiving directions of the multi-directional antenna showing sensitivities of television broadcast signals of an optional channel larger than a predetermined threshold value;

switching or changing the effective signal receiving direction of the multi-directional antenna between said two signal receiving directions with shortening the interval for switching or changing the effective signal receiving direction of the multi-directional antenna;

measuring sensitivities of the television broadcast signals in said two directions whenever the effective signal receiving direction of the multi-directional antenna is switched or changed between said two signal receiving directions;

comparing a measured data of sensitivity with another previously measured data in each of said two signal receiving directions and judging whether compared two measured data of sensitivities substantially coincide with each other or not; and deciding a value of proximate interval as the term suitable for switching or changing the effective signal receiving direction of the multi-directional antenna, when it is judged that said compared two measured data of sensitivities do not coincide with each other.

Furthermore, it is possible that the controller sets a value longer than a longest term necessary for switching or changing an effective signal receiving direction of a multi-directional antenna in market as an initial value of the interval for switching or changing the effective signal receiving direction of the multi-directional antenna.

Still furthermore, it is possible that the controller measures an sensitivity of a television broadcast signal in each signal receiving direction with respect to each channel, compares values of measured sensitivities with each other, and decides a direction in which the value of the measured sensitivity is largest as an optimum signal receiving direction of each channel.

Still furthermore, it is possible that the controller can perform an automatic scanning operation for switching or changing the effective signal receiving direction of the multi-directional antenna to a signal receiving direction, in which the signal receiving condition of an optional channel is highest.

DETAILED DESCRIPTION OF THE EMBODIMENT

Figure 1:
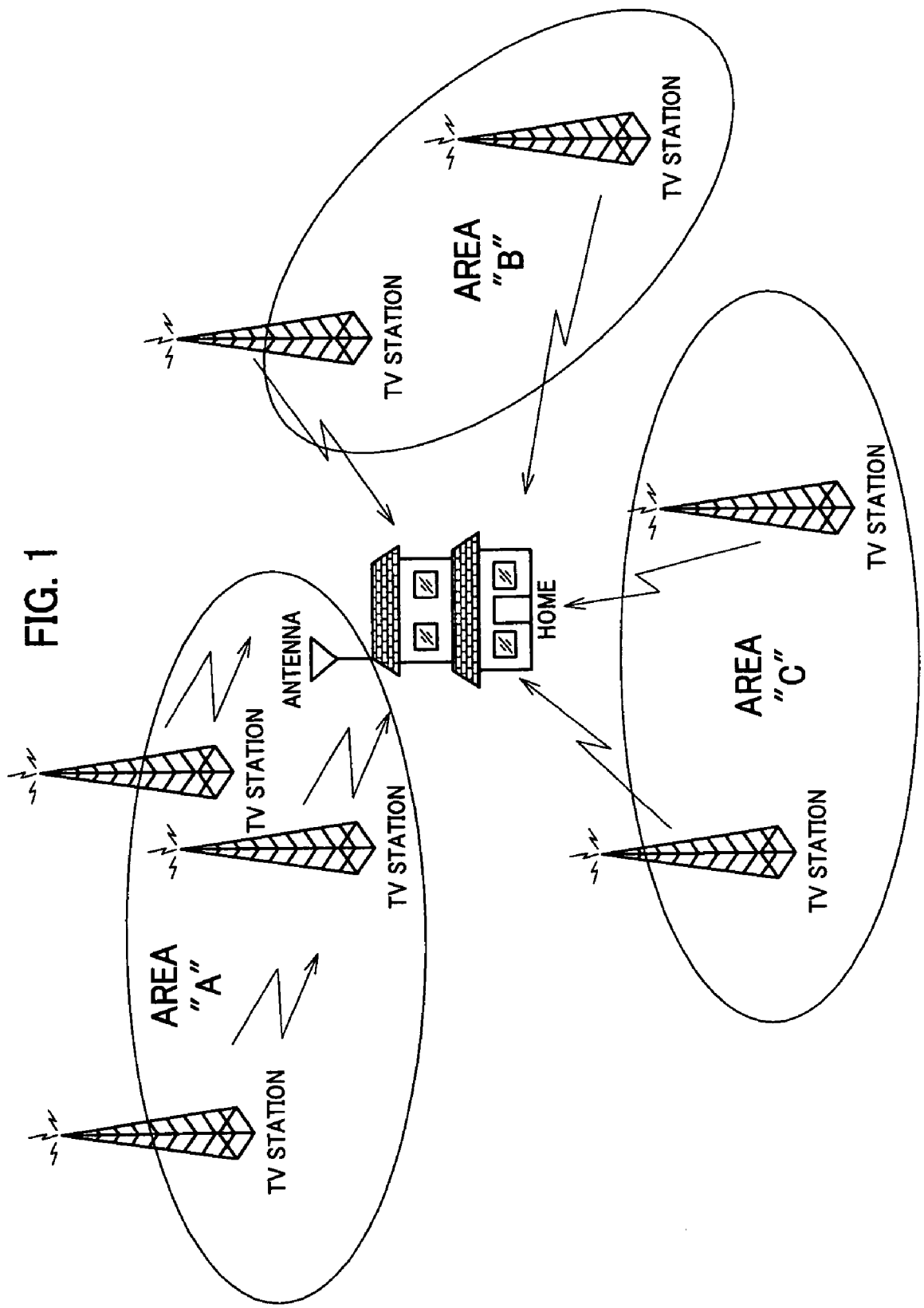
FIG. 1 is a conceptual diagram showing a circumstance for receiving digital television (TV) broadcast signals in home.

A digital TV broadcast signal receiver in accordance with an embodiment of the present invention is described with reference to figures. A circumstance for receiving TV broadcast signals in home is shown in FIG. 1. In an area where grand-based digital TV broadcast is performed, when a sensitivity of received signal of a TV broadcast signal is equal to or larger than a predetermined threshold value, an image having a predetermined image quality can be obtained by correction. Thus, it is possible to view TV programs by receiving TV broadcast signals which are delivered from TV stations existing at many positions in such as areas designated by symbols A, B, C, and so on, as shown in FIG. 1. According to such a circumstance, various types of multi-directional antennas called smart antenna having a plurality of signal receiving directions are put into practical use.

The digital TV broadcast signal receiver 1 can receive analogue TV broadcast signals, and it performs a control of optimum signal receiving directions of the analogue TV broadcast signals without performing scanning operation to indistinctive signal receiving directions in practice, when a simplified multi-directional antenna is connected thereto, similar to the digital TV broadcast signals. Accordingly, when there is no need to distinguish from the analogue TV broadcast signal(s) from the digital TV broadcast signal(s), in particular, it is described simply as TV broadcast signal(s).

As a configuration of the multi-directional antenna, there are many types, for example, for rotating an antenna with a motor for changing the signal receiving direction, or having a plurality of signal receiving directions and electronic switches and selecting an effective signal receiving direction by switching on and off of the electronic switches. In addition, according to the EIA-909 technical standard, it is defined that a number of the signal receiving directions of the multi-directional antenna is defined as sixteen. A digital TV broadcast signal receiver in compliance with the EIA-909 technical standard can switch all of sixteen signal receiving directions with no relation to kind or number of signal receiving directions of the multi-directional antenna connected thereto. The digital TV broadcast signal receiver, however, cannot confirm kind or specification of a connected multi-directional antenna, directly.

The digital TV broadcast signal receiver in accordance with this embodiment performs a predetermined initial processing when a multi-directional antenna is connected thereto so as to measure a term necessary for switching or changing an effective signal receiving direction of the connected multi-directional antenna. Subsequently, the digital TV broadcast signal receiver decides a signal receiving direction switching term suitable for the connected multi-directional antenna with using the measured term. The signal receiving direction switching term is, for example, calculated to add a time tolerance to the measured term. When a channel is chosen by a user, the digital TV broadcast signal receiver outputs a control signal at an interval of the signal receiving direction switching term for switching or changing the effective signal receiving direction of the multi-directional antenna to an optimum signal receiving direction of the channel.

Figure 2:
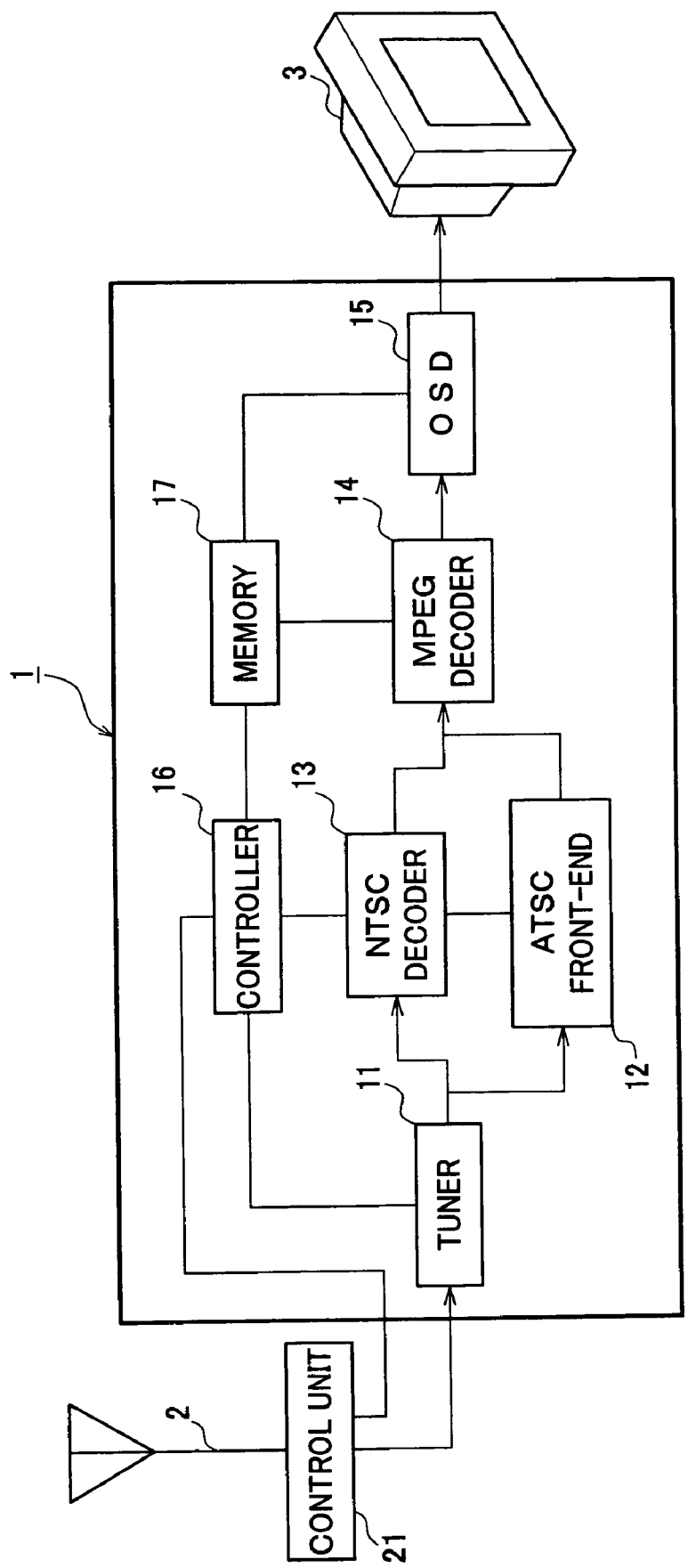
FIG. 2 is a block diagram showing a configuration of a digital TV broadcast signal receiver in accordance with an embodiment of the present invention.

A configuration of the digital TV broadcast signal receiver 1 in accordance with this embodiment is shown in FIG. 2. The digital TV broadcast signal receiver 1 comprises a tuner 11 serving as a TV broadcast signal receiving means which is connected to a multi-directional antenna 2, an ATSC front-end 12 serving as a digital signal processing means for processing predetermined signal processing to digital TV broadcast signals received by the tuner 11, and decoding the processed signals, an NTSC decoder 13 serving an analogue signal processing means for decoding analogue TV broadcast signals received by the tuner 11, an MPEG decoder 14 serving as signal output means for decoding MPEG compressed TV broadcast signals, an on screen display unit (OSD) 15 for superimposing a predetermined display image onto the decoded TV broadcast signals, a controller (CPU) 16 serving as entire control means for sensing signal receiving condition of the TV broadcast signals received by the tuner 11, for controlling a control unit 21 of the multi-directional antenna 2 (serving as a signal receiving direction deciding means, a control signal output means and a means for measuring a signal receiving direction switching term), and for controlling the ATSC front-end 12, the NTSC decoder 13, and so on, and a memory 17 serving an memory means for temporarily memorizing the decoded TV broadcast signals and for memorizing the display image to be superimposed on the decoded TV broadcast signals. The decoded TV broadcast signals decoded by the MPEG decoder 14 is outputted to a monitor display apparatus 3 through the on screen display unit 15, so that the image is displayed on the screen of the monitor display apparatus 3.

In the digital TV broadcast, data can be transmitted from the digital TV broadcast signal receiver 1 at user side to the TV station. It, however, is nothing to the present invention directly, so that the description of it is omitted.

The control unit 21 of the multi-directional antenna 2 makes only one signal receiving direction among a plurality of the signal receiving directions, which is chosen by the controller 16, effective, corresponding to the control signal outputted from the controller 16. When the multi-directional antenna 2 rotates an antenna with a motor in order to change the signal receiving direction, the control unit 21 controls the motor to orientating the antenna corresponding to the direction selected by the controller 16. Alternatively, when the multi-directional antenna 2 switches on and off of electronic switches in order to switch the effective signal receiving direction, the control unit 21 switches on only one electronic switch corresponding to the direction selected by the controller 16 and off the other electronic switches.

Figure 3A:
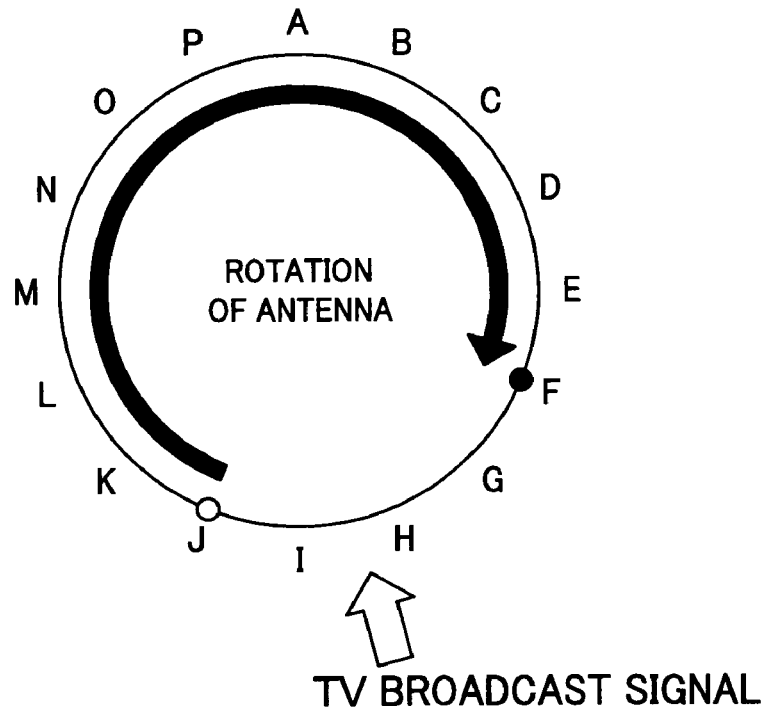
FIG. 3A is a conceptual diagram showing a concept for changing an effective signal receiving direction of a multi-directional antenna in which the antenna is rotated with a motor.

A concept for changing the effective signal receiving direction of the multi-directional antenna in which the antenna is rotated with a motor is illustrated in FIG. 3A. In this case, For example, when the effective signal receiving direction of the multi-directional antenna is changed from a direction designated by a symbol "J" (hereinafter, abbreviated as J-direction) to a direction designated by a symbol "F" (hereinafter, abbreviated as F-direction), the antenna previously oriented to J-direction is rotated in clockwise direction or in counter-clockwise direction, and stopped at a position orienting F-direction. When the antenna is rotated in the same direction at all times, it is advantageous that the control becomes simple, but the antenna is rotated at most 337.5 degrees. Alternatively, when the antenna is rotated in both directions, it is necessary to calculate rotation angles of the antenna in both directions and to switch the rotation direction of the motor in a direction in which the rotation angle of the antenna is smaller, even though it is advantageous that the largest rotation angle of the antenna can be reduced to 180 degrees. In both cases, a term necessary for changing the effective signal receiving direction of the antenna is uneven due to the rotation angle of the antenna. In addition, the term necessary for changing the effective signal receiving direction of the antenna has a variation due to power of the motor. Thus, a term about 100 ms to 200 ms extent is necessary to ensure the change of the effective signal receiving direction of the multi-directional antenna, in general.

Figure 3B:
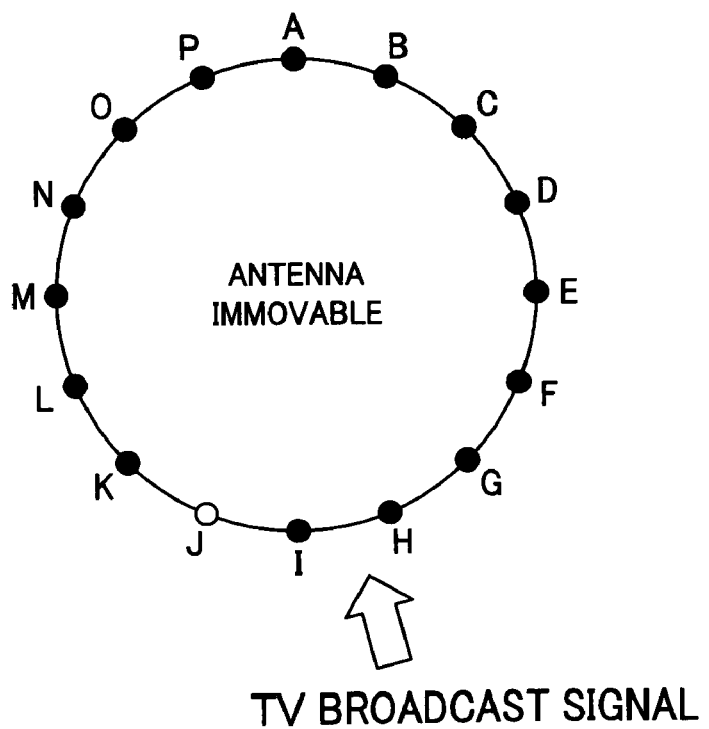
FIG. 3B is a conceptual diagram showing a concept for switching an effective signal receiving directions of a multi-directional antenna with using electronic switches.

Alternatively, a concept for switching the effective signal receiving direction of the multi-directional antenna with using the electronic switches is illustrated in FIG. 3B. A sub-antenna and an electronic switch are provided in each of sixteen signal receiving directions. Any one of the sub-antenna is made effective by switching on the electronic switch connected thereto, and switching off the rest electronic switches. Since the multi-directional antenna is immovable, a term necessary for switching the effective signal receiving direction of the multi-directional antenna is substantially even and shorter about 10 ms with no relation to an angle between two effective signal receiving directions before and after the switching operation.

As just described, the term necessary for switching or changing the effective signal receiving direction of the multi-directional antenna is largely different due to kinds or specification of the multi-directional antenna connected to the digital TV broadcast signal receiver.

Figure 4:
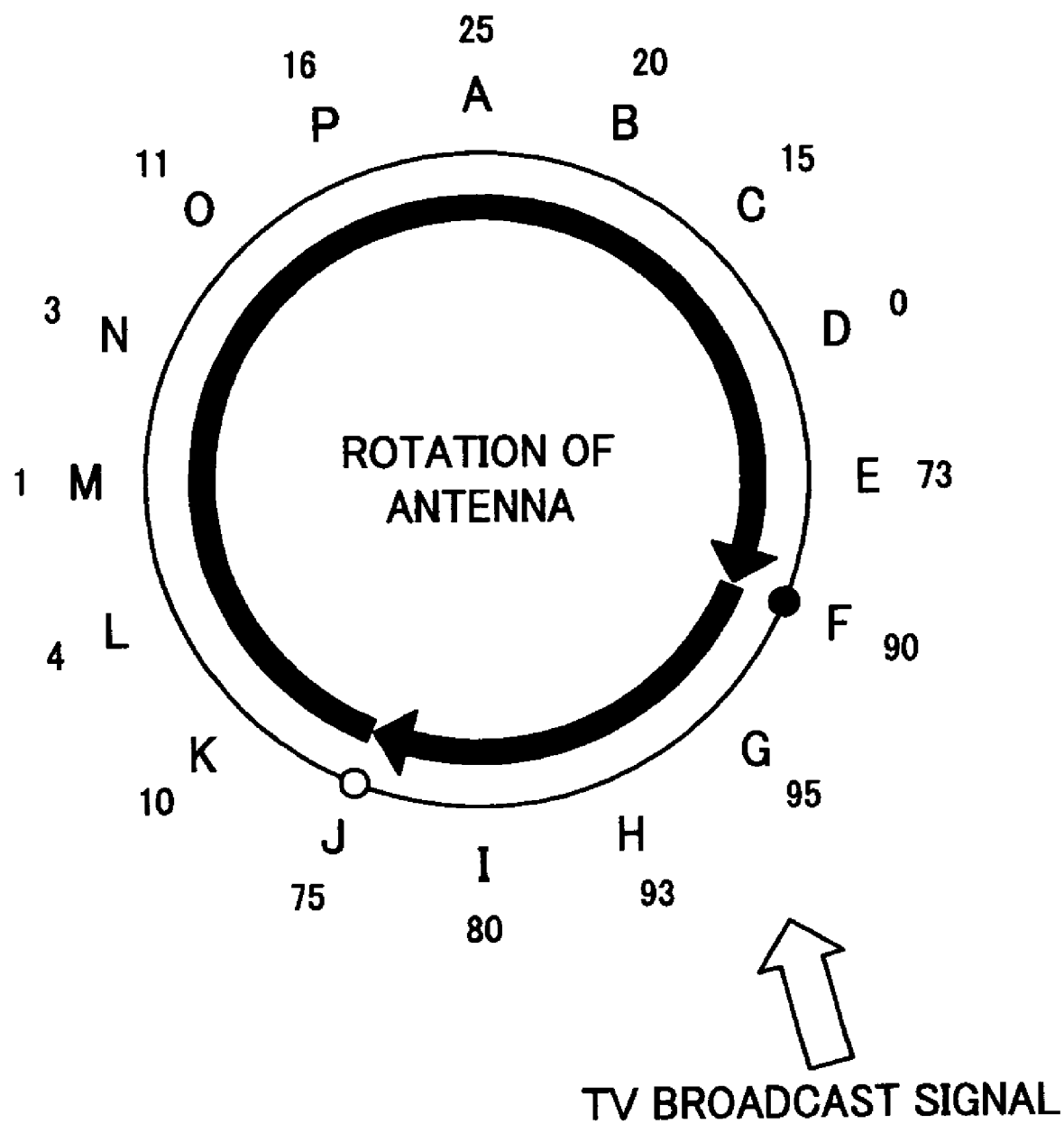
FIG. 4 is a diagram showing an example of signal receiving conditions of a TV broadcast signal of a channel.
Figure 5:
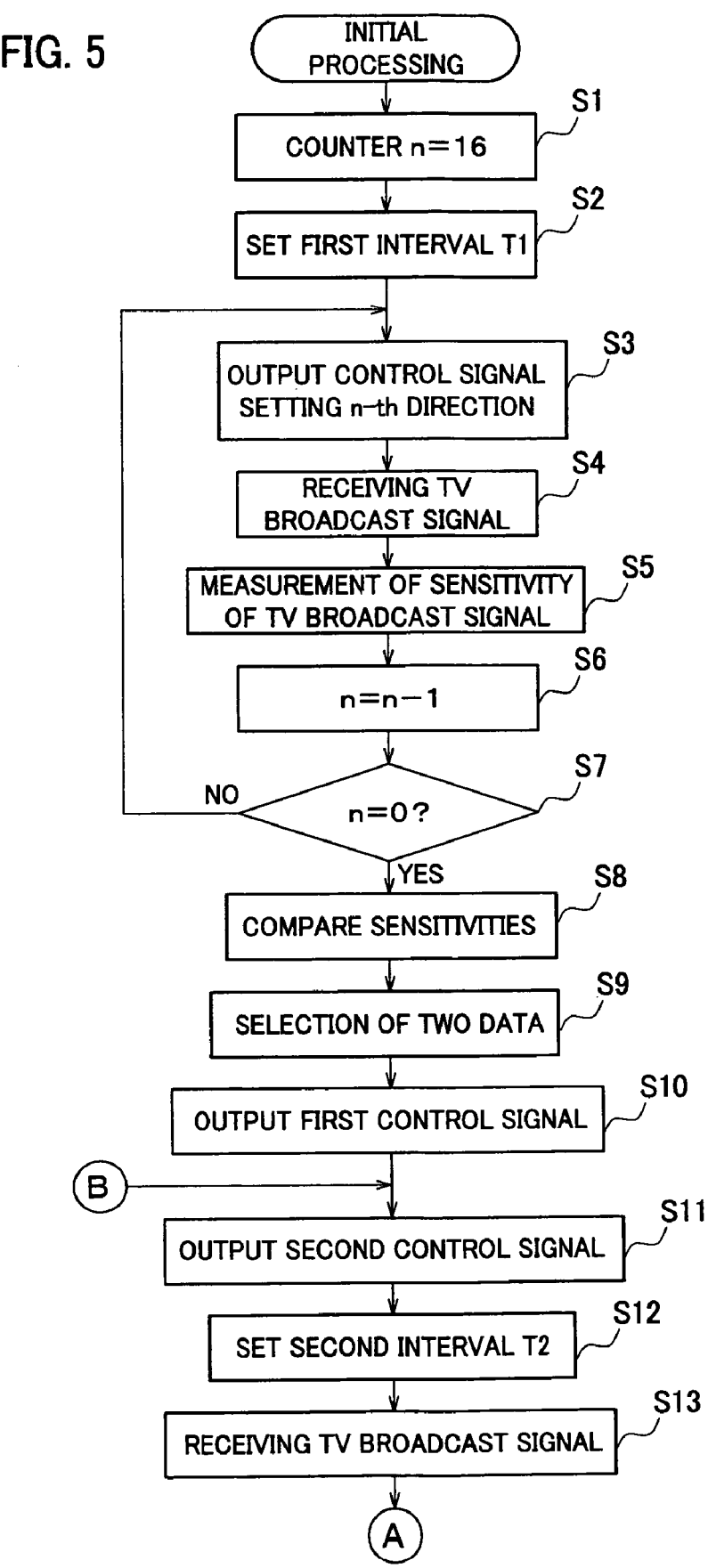
FIG. 5 is a flowchart showing a process for setting a term suitable for switching or changing an effective signal receiving direction of a multi-directional antenna in the digital TV broadcast signal receiver.
Figure 6:
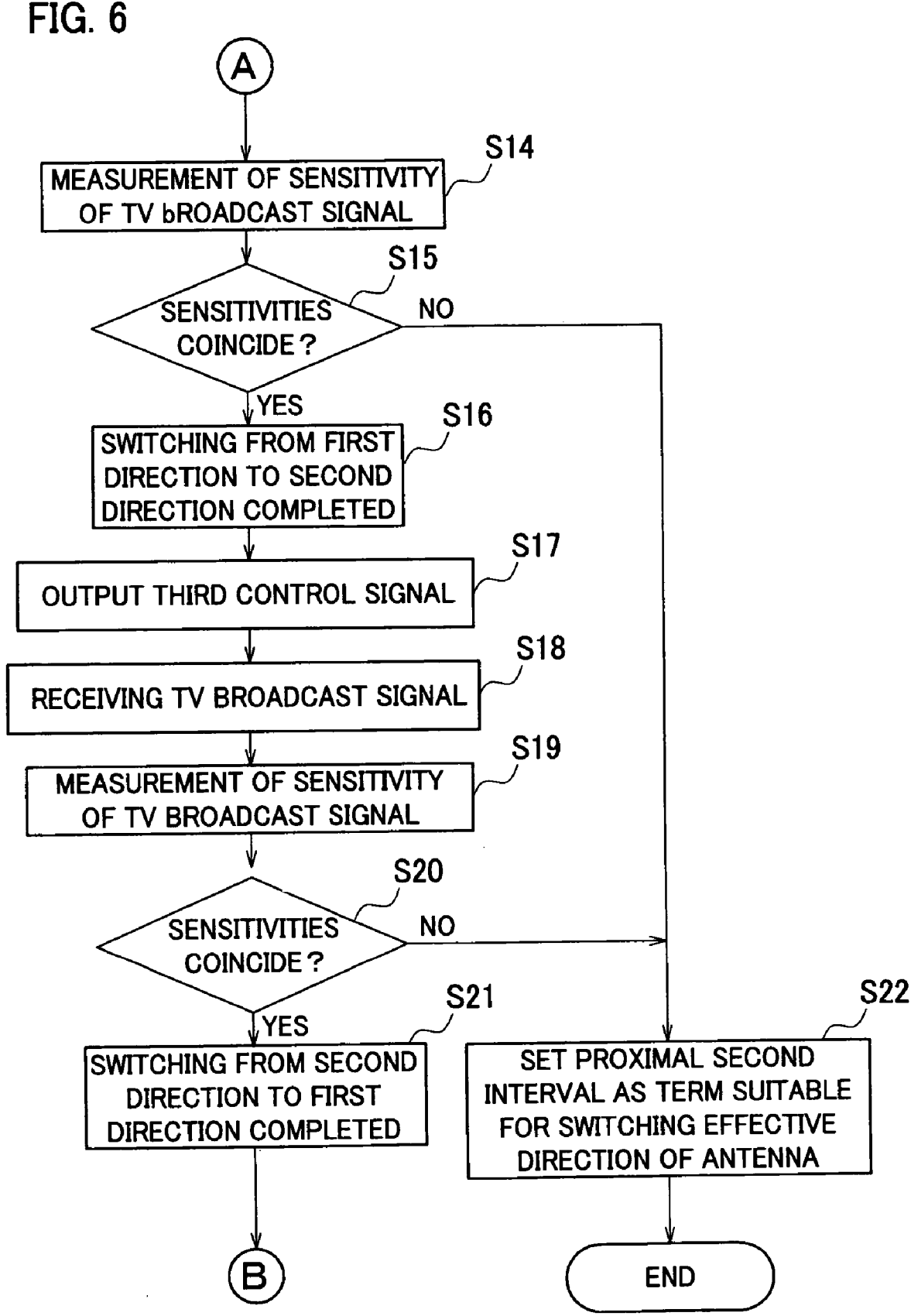
FIG. 6 is a flowchart showing a continuation of the flowchart shown in FIG. 5.

Subsequently, an operation for setting a term suitable for changing an effective signal receiving direction of a multi-directional antenna connected to the digital TV broadcast signal receiver is described with reference to FIG. 4 showing an example of a signal receiving condition and flowcharts shown in FIGS. 5 and 6. In FIG. 4, each numeral shows sensitivity of received TV broadcast signal of an optional channel in each signal receiving direction.

When the controller 16 senses that the multi-directional antenna 2 is connected to the tuner 11, the controller 16 performs an initial processing for setting a term suitable for changing an effective signal receiving direction of the connected multi-directional antenna 2. The controller 16 sets a numeric value n=16 in a counter (S1), and sets a term, for example, 300 ms as a fist interval T1, which is longer than the longest term necessary for changing the effective signal receiving direction of the multi-directional antenna connectable to the digital TV broadcast signal receiver (S2). Subsequently, the controller 16 outputs a control signal for selecting the n-th direction to the control unit 21 of the multi-directional antenna 2 (S3). After outputting the control signal to the control unit 21 of the multi-directional antenna 2, and passing the first interval T1, that is, the effective signal receiving direction of the multi-directional antenna 2 is surely set to the n-th direction, the TV broadcast signal of a optional channel is received through the tuner 11 (S4). When the TV broadcast signal is received, the controller 16 measures an sensitivity of received TV broadcast signal, and memorizes a measurement data of sensitivity into the memory 17 (S5). Subsequently, the controller 16 subtracts a value one from the numeric value of the counter (S6), and judges whether the measurement of the sensitivity of the TV broadcast signal in each channel of sixteen signal receiving directions has been completed or not (S7). When the measurement of the sensitivity of the TV broadcast signal in each of sixteen signal receiving directions has not been completed, the controller 16 returns to the step S3, and measures the sensitivity of the TV broadcast signal in next signal receiving direction ((n-1)-th direction).

When the measurement of the sensitivity of the TV broadcast signal in each of the sixteen signal receiving directions has been completed (YES in S7), the controller 16 reads out the measured data of sensitivities memorized in the memory 17, compares the data of sensitivities of the TV broadcast signals with a predetermined threshold value (S8), and selects two values larger than the predetermined threshold value (S9). As shown in FIG. 4, a TV broadcast signal transmitted from a predetermined direction can be received substantially in all signal receiving directions of the multi-directional antenna. However, when the sensitivity of the TV broadcast signal is lower, the signal receiving condition of the TV broadcast signal is not so good, so that it is easily affected by noise. Therefore, measurement error of the sensitivities of the TV broadcast signals which will be measured repeatedly later becomes larger. Accordingly, optional two data of sensitivities is selected among the data of sensitivities larger than the predetermined value.

When the optional two data of sensitivities are selected, the controller 16 outputs a first control signal so as to set the effective signal receiving direction of the multi-directional antenna to a first signal receiving direction corresponding to one of the data of sensitivity among the selected two data of sensitivities (S10). Thereby, an initial position of the effective signal receiving direction of the multi-directional antenna is set. After outputting the first control signal and passing at least the first interval, the controller 16 outputs a second control signal so as to switch or change the effective signal receiving direction of the multi-directional antenna to a second signal receiving direction corresponding to the other of the data of sensitivity among the selected two data of sensitivities (S11).

The controller 16 sets a second interval T2 shorter than the first interval T1, in parallel with the above-mentioned processes (S12). A term, for example, 250 ms shorter by 50 ms than the first interval T1 (300 ms) is set as an initial value of the second interval T2. The value of the second interval T2 will be gradually reduced as described below.

After outputting the second control signal, the tuner 11 receives a TV broadcast signal of the optional channel at the interval T2 (S13), and the controller 16 measures the sensitivity of the TV broadcast signal (S14). Then, the controller 16 compares newly measured data of sensitivity with the data of sensitivity in the second signal receiving direction memorized in the memory 17 (S15). When these two data of sensitivities substantially coincide with each other, the controller 16 judges that the switching or changing of the effective signal receiving direction of the multi-directional antenna 2 from the first signal receiving direction to the second signal receiving direction has been completed within the second interval T2 (S16), and outputs a third control signal for switching or changing the effective signal receiving direction of the multi-directional antenna 2 from the second signal receiving direction to the first signal receiving direction (S17).

After outputting the third control signal, the tuner 11 receives a TV broadcast signal of the optional channel at the interval T2 (S18), and the controller 16 measures the sensitivity of the TV broadcast signal (S19). Then, the controller 16 compares newly measured data of sensitivity with the data of sensitivity in the first signal receiving direction memorized in the memory 17 (S20). When these two data of sensitivities substantially coincide with each other, the controller 16 judges that the switching or changing of the effective signal receiving direction of the multi-directional antenna 2 from the second signal receiving direction to the first signal receiving direction has been completed within the second interval T2 (S21).

According to these steps, it is confirmed that the term necessary for switching or changing the effective signal receiving direction of the multi-directional antenna connected to the digital TV broadcast signal receiver 1 is shorter than 250 ms. Thus, the controller 16 repeats the steps S11 to S21 for switching or changing the effective signal receiving direction between the first signal receiving direction and the second signal receiving direction, measuring the sensitivities of the TV broadcast signals and comparing the measured data of sensitivity with the data of sensitivity memorized in the memory 17 with shortening the second interval T2 little at each time, until it is judged that the effective signal receiving direction of the multi-directional antenna cannot be switched or changed between the first signal receiving direction and the second signal receiving direction, since two data of sensitivities do not coincide with each other in the step S15 or S20.

In subsequent step S12, the value of the second interval T2 is change to a value gradually smaller. For example, a value of the second interval T2 for the second time is set to be 200 ms, which is shorter by 50 ms from the initial value 250 ms of the second interval T2. Similarly, a value of the second interval T2 for the third time is set to be 150 ms, which is shorter by 50 ms from the proximate value 200 ms of the second interval T2, and so fourth.

In the step S15 or S20, when the measured data of sensitivity does not coincide with the data of sensitivity memorized in the memory 17, the controller 16 judges that the effective signal receiving direction of the multi-directional antenna cannot be switched or changed between the first signal receiving direction and the second signal receiving direction, and sets the proximate value of the second interval T2 as the term suitable for switching the effective signal receiving direction of the multi-directional antenna 2 connected to the digital TV broadcast signal receiver 1 (S22). For example, it is assumed that the measured data of sensitivity does not coincide with the data of sensitivity memorized in the memory 17 when the second interval T2 is 100 ms. The controller 16 sets the proximate value 150 ms of the second interval T2 as the term suitable for switching the effective signal receiving direction of the multi-directional antenna 2.

When a user selects an automatic scanning mode, the controller 16 outputs control signals at the above-mentioned proximate second interval T2, and measures a sensitivity of TV broadcast signal of an optional channel chosen by the user in each signal receiving direction of the multi-directional antenna. Subsequently, the controller 16 judges that a signal receiving direction of the multi-directional antenna showing the largest value of the sensitivity of the TV broadcast signal as an optimum signal receiving direction of the channel, and sets the effective signal receiving direction of the multi-directional antenna to the optimum signal receiving direction.

Figure 7:
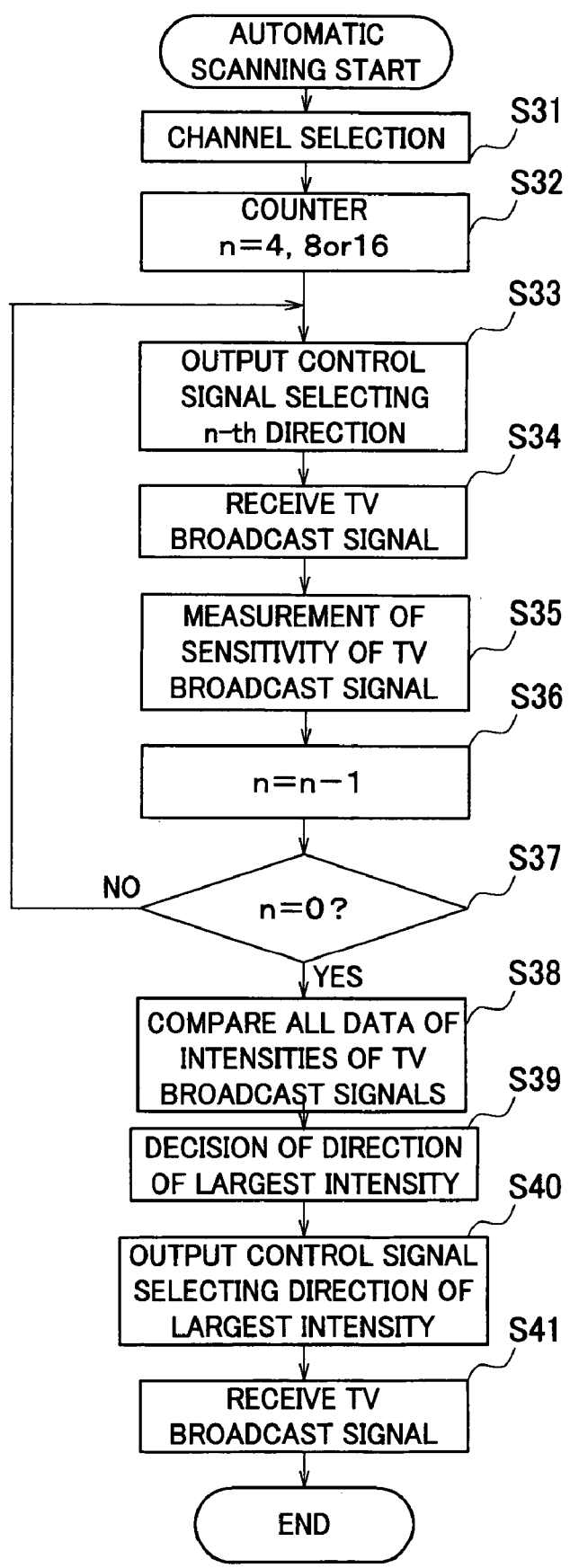
FIG. 7 is a flowchart showing automatic scanning operation in the digital TV broadcast signal receiver.

Subsequently, the automatic scanning operation of the digital TV broadcast signal receiver 1 is described with reference to a flowchart shown in FIG. 7. When a user selects an automatic scanning mode, and selects a channel to be viewed (S31), the controller 16 sets the initial value n=16 to a counter as a number of signal receiving directions of the multi-directional antenna 2 (S32). Then, the controller 16 outputs a control signal for selecting the n-th signal receiving direction (S33). After waiting the term, for example, 150 ms suitable for switching the effective signal receiving direction of the multi-directional antenna 2 set in the above-mentioned initial processing, the tuner 11 receives the TV broadcast signal of the optional channel (S34). Subsequently, the controller 16 measures the sensitivity of the received TV broadcast signal, and memorizes the measured data of sensitivity into the memory 17 (S35). The controller 16 subtracts one from the numeric value of the counter (S36), and judges whether the measurement of the sensitivities of the TV broadcast signals in all the signal receiving directions of the multi-directional antenna 2 has been completed or not (S37). When the measurement of the sensitivities of the TV broadcast signals in all signal receiving directions has not been completed, the controller 16 returns to the step S33, and measures the sensitivity of the TV broadcast signal in next signal receiving direction.

When the measurement of the sensitivities of the TV broadcast signals in all signal receiving directions has been completed (YES in S37), the controller 16 reads out the measured data of sensitivities memorized in the memory 17, compares all the data of sensitivities with each other (S38), and decides the largest value among the measured data of sensitivities, that is, a direction showing the largest sensitivity of the TV broadcast signal of the channel (S39). Subsequently, the controller 16 outputs a control signal for selecting the signal receiving direction showing the largest sensitivity of the TV broadcast signal to the control unit 21 of the multi-directional antenna 2 (S40). After passing the term suitable for switching the effective signal receiving direction of the multi-directional antenna 2, the tuner 11 starts to receive the TV broadcast signal of the optional channel (S41).

The present invention, however, is not restricted by the above-mentioned description and illustration of the embodiment. In a digital television broadcast signal receiver connected to a multi-directional antenna having a plurality of signal receiving directions in compliance with a predetermined technical standard, receiving a digital television broadcast signal by making only one signal receiving direction among a plurality of signal receiving directions effective, it is sufficient that a term necessary for switching or changing an effective signal receiving direction of a multi-directional antenna connected thereto is measured, and control signals are outputted at an interval suitable for switching or changing the effective signal receiving direction of the multi-directional antenna corresponding to the measured term so as to switch the effective signal receiving direction of the multi-directional antenna to an optimum signal receiving direction of a channel chosen by a user. Consequently, it is possible to shorten a term necessary for switching or changing the effective signal receiving direction of the multi-directional antenna to the optimum signal receiving direction of the channel chosen by the user. Especially, it is more effective in an automatic scanning mode for automatically setting the effective signal receiving direction of the multi-directional antenna to a signal receiving direction showing the highest sensitivity of the TV broadcast signal of the channel chosen by the user. In addition, the number of the signal receiving directions of the multi-directional antenna is not limited to sixteen as described in the embodiment. It is possible that the multi-directional antenna can have four, eight or other number of signal receiving directions.

This application is based on Japanese patent application 2004-132343 filed Apr. 28, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital television broadcast signal receiver connected to a multi-directional antenna having a plurality of signal receiving directions in compliance with a predetermined technical standard, receiving a digital television broadcast signal by making only one signal receiving direction among a plurality of the signal receiving directions effective, comprising:
    a tuner for receiving a digital television broadcast signal through the multi-directional antenna; and
    a controller for switching an effective signal receiving direction of the multi-directional antenna; wherein
    when a multi-directional antenna is connected to the tuner, the controller measures a term suitable for switching or changing an effective signal receiving direction of the multi-directional antenna,
    when a user chooses a channel, the controller outputs control signals at an interval corresponding to the measured term so as to switch the effective signal receiving direction of the multi-directional antenna to an optimum signal receiving direction of the channel, and
    the controller performs following operations for measuring the term suitable for switching or changing the effective signal receiving direction of the multi-directional antenna:
        selecting two signal receiving directions among a plurality of signal receiving directions of the multi-directional antenna showing sensitivities of television broadcast signals of a channel larger than a predetermined threshold value;
        switching or changing the effective signal receiving direction of the multi-directional antenna between said two signal receiving directions with shortening the interval for switching or changing the effective signal receiving direction of the multi-directional antenna;
        measuring sensitivities of the television broadcast signals in said two directions whenever the effective signal receiving direction of the multi-directional antenna is switched or changed between said two signal receiving directions;
        comparing a measured data of sensitivity with another previously measured data in each of said two signal receiving directions and judging whether compared two measured data of sensitivities substantially coincide with each other or not; and
        deciding a value of proximate interval as the term suitable for switching or changing the effective signal receiving direction of the multi-directional antenna, when it is judged that said compared two measured data of sensitivities do not coincide with each other.

2. The digital television broadcast signal receiver in accordance with claim 1, wherein
    the controller sets a value longer than a longest term necessary for switching or changing an effective signal receiving direction of a multi-directional antenna in market as an initial value of the interval for switching or changing the effective signal receiving direction of the multi-directional antenna.

3. The digital television broadcast signal receiver in accordance with claim 1, wherein the controller measures an sensitivity of a television broadcast signal in each signal receiving direction with respect to each channel, compares values of measured sensitivities with each other, and decides a direction in which the value of the measured sensitivity is largest as an optimum signal receiving direction of each channel.

4. The digital television broadcast signal receiver in accordance with claim 1, wherein
the controller can perform an automatic scanning operation for switching or changing the effective signal receiving direction of the multi-directional antenna to a signal receiving direction, in which the signal receiving condition of a channel is highest.

5. The digital television broadcast signal receiver in accordance with claim 1, wherein
the multi-directional antenna connected to the tuner is a type for rotating an antenna with a motor.

6. A digital television broadcast signal receiver, to which a multi-directional antenna having sixteen signal receiving directions in compliance with a predetermined technical standard, receiving a digital television broadcast signal by making only one signal receiving direction among the sixteen signal receiving directions effective, comprising:
a control signal output means for outputting a control signal for directing a signal receiving direction to the multi-directional antenna so as to receive a television broadcast signal;
a television broadcast signal receiving means connected to the multi-directional antenna for receiving a digital television broadcast signal;
a signal processing means for performing a predetermined signal processing to the television broadcast signal received by the television broadcast signal receiving means;
a signal output means for outputting a signal processed by the signal processing means to a monitor display apparatus;
a memory means for temporarily memorizing the signal processed by the signal processing means;
a signal receiving direction deciding means for deciding an optimum signal receiving direction with respect to each receivable channel with using the signals memorized in the memory means;
a term measuring means for measuring a term necessary for switching or changing an effective signal receiving direction of the connected multi-directional antenna; and
an entire control means for controlling each component of the digital television broadcast signal receiver, and wherein
when any multi-directional antenna is connected to the tuner,
the control signal output means outputs control signals at a first interval longer than a signal receiving direction switching term of a multi-directional antenna which needs the longest term for switching or changing the effective signal receiving direction thereof among connectable multi-directional antennas;
the television broadcast signal receiving means serially receives television broadcast signals of a channel in each signal receiving direction through the connected multi-directional antenna at the first interval;
the signal processing means measures sensitivities of received television broadcast signals, and memorizes data of sensitivities with respect to the signal receiving directions into the memory means;
the signal receiving direction deciding means selects two data of sensitivities among a plurality of data of sensitivities larger than a predetermined threshold value memorized in the memory means;
the control signal output means outputs a first control signal so as to switch or change the effective signal receiving direction of the multi-directional antenna to a first signal receiving direction corresponding to one of data of sensitivity among selected two data of sensitivities, and outputs a second control signal so as to switch or change the effective signal receiving direction of the multi-directional antenna to a second signal receiving direction corresponding to the other data of sensitivity among selected two data of sensitivities, after outputting the first control signal and passing at least the first interval;
after outputting the second control signal, the television broadcast signal receiving means receives a television broadcast signal of the channel at a second interval shorter than the first interval;
the signal processing means measures a sensitivity of received television broadcast signal;
the term measuring means compares a measured data of sensitivity with the data of sensitivity in the second signal receiving direction memorized in the memory means, and judges that the switching or changing the effective signal receiving direction of the multi-directional antenna from the first signal receiving direction to the second signal receiving direction has been completed when the data of sensitivities coincide with each other;
when it is judged that the effective signal receiving direction of the multi-directional antenna from the first signal receiving direction to the second signal receiving direction at the second interval, the control signal output means outputs a third control signal so as to switch or change the effective signal receiving direction of the multi-directional antenna from the second signal receiving direction to the first signal receiving direction;
after outputting the third control signal, the television broadcast signal receiving means receives a television broadcast signal of the channel at the second interval;
the signal processing means measures a sensitivity of received television broadcast signal;
the term measuring means compares a measured data of sensitivity with the data of sensitivity in the first signal receiving direction memorized in the memory means, and judges that the switching or changing the effective signal receiving direction of the multi-directional antenna from the second signal receiving direction to the first signal receiving direction has been completed when the data of sensitivities coincide with each other;
the entire control means repeats switching or changing of the effective signal receiving direction of the multi-directional antenna between the first signal receiving direction and the second signal receiving direction, measurement of television broadcast signals of the channel, comparing of measured data of sensitivities with data of sensitivities memorized in the memory means with shortening the second interval little at each time until any measured data of sensitivity does not coincide with the data of sensitivity memorized in the memory means and it is judged that the switching or changing of the effective signal receiving direction of the multi-directional antenna between the first signal receiving direction and the second signal receiving direction by the term measuring means; and the term measuring means sets a proximate value of the second interval as a term suitable for switching or changing the effective signal receiving direction of the connected multi-directional antenna, when it is judged that the switching or changing of the effective signal receiving direction of the multi-directional antenna between the first signal receiving direction and the second signal receiving direction.

7. The digital television broadcast signal receiver in accordance with claim 6, further comprising:
an automatic scanning mode automatically switching the effective signal receiving direction of the multi-directional antenna to a signal receiving direction, in which the value of the sensitivity of the television broadcast signal is the largest; and wherein when a user selects the automatic scanning mode, the control signal output means outputs control signals at an interval of the term suitable for switching or changing the effective signal receiving direction of the connected multi-directional antenna;

the television broadcast signal receiving means receives a television broadcast signal of a channel chosen by the user at the interval in each signal receiving direction of the multi-directional antenna;

the signal processing means measures a sensitivity of received television broadcast signal;

the signal receiving direction deciding means judges that a signal receiving direction showing a largest value of sensitivity of the television broadcast signal among the sensitivities of the received television broadcast signal as an optimum signal receiving direction of the channel; and the control signal output means outputs a control signal for switching or changing the effective signal receiving direction of the multi-directional antenna to the optimum signal receiving direction of the channel.

* * * * *